Patented June 26, 1951

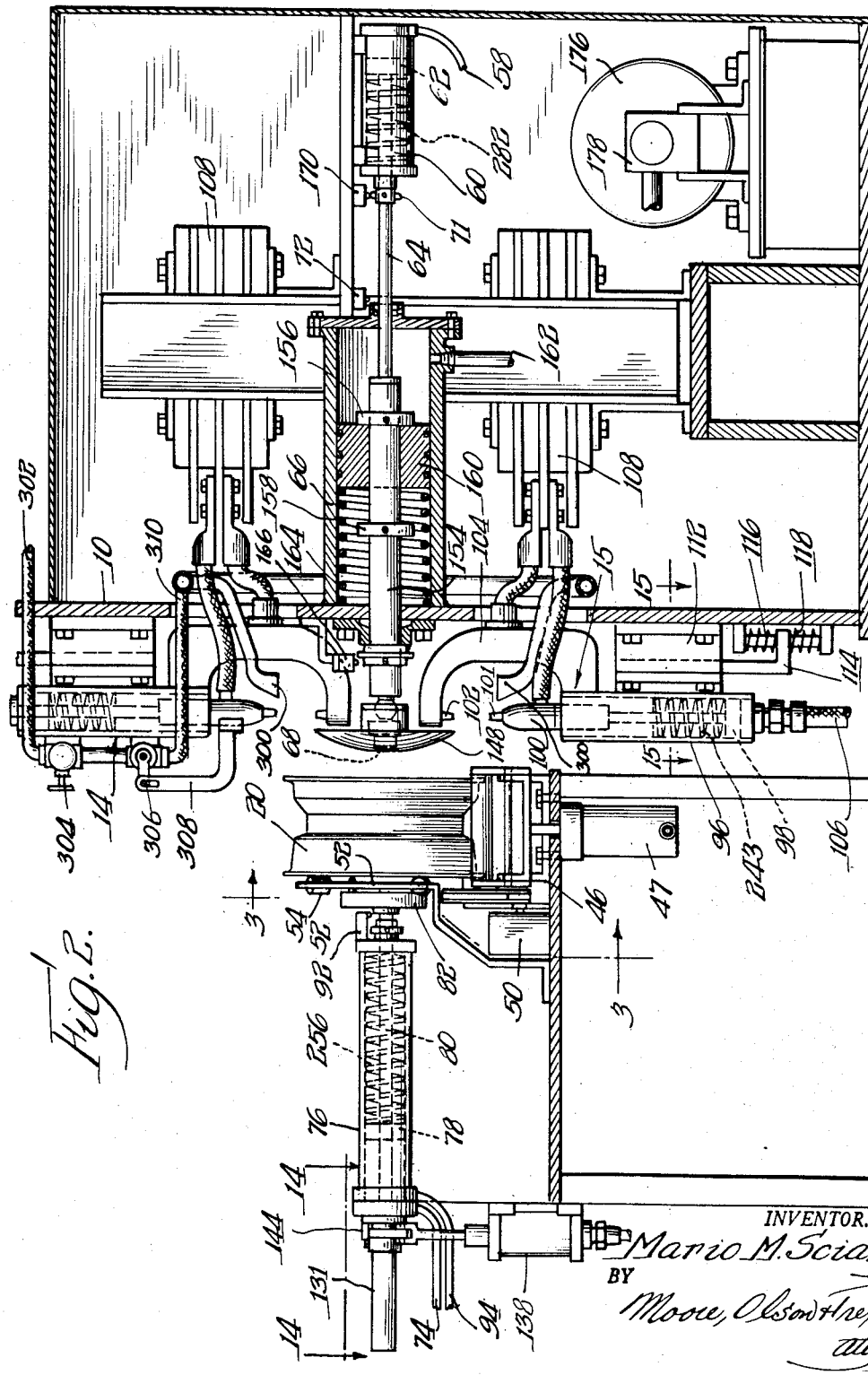

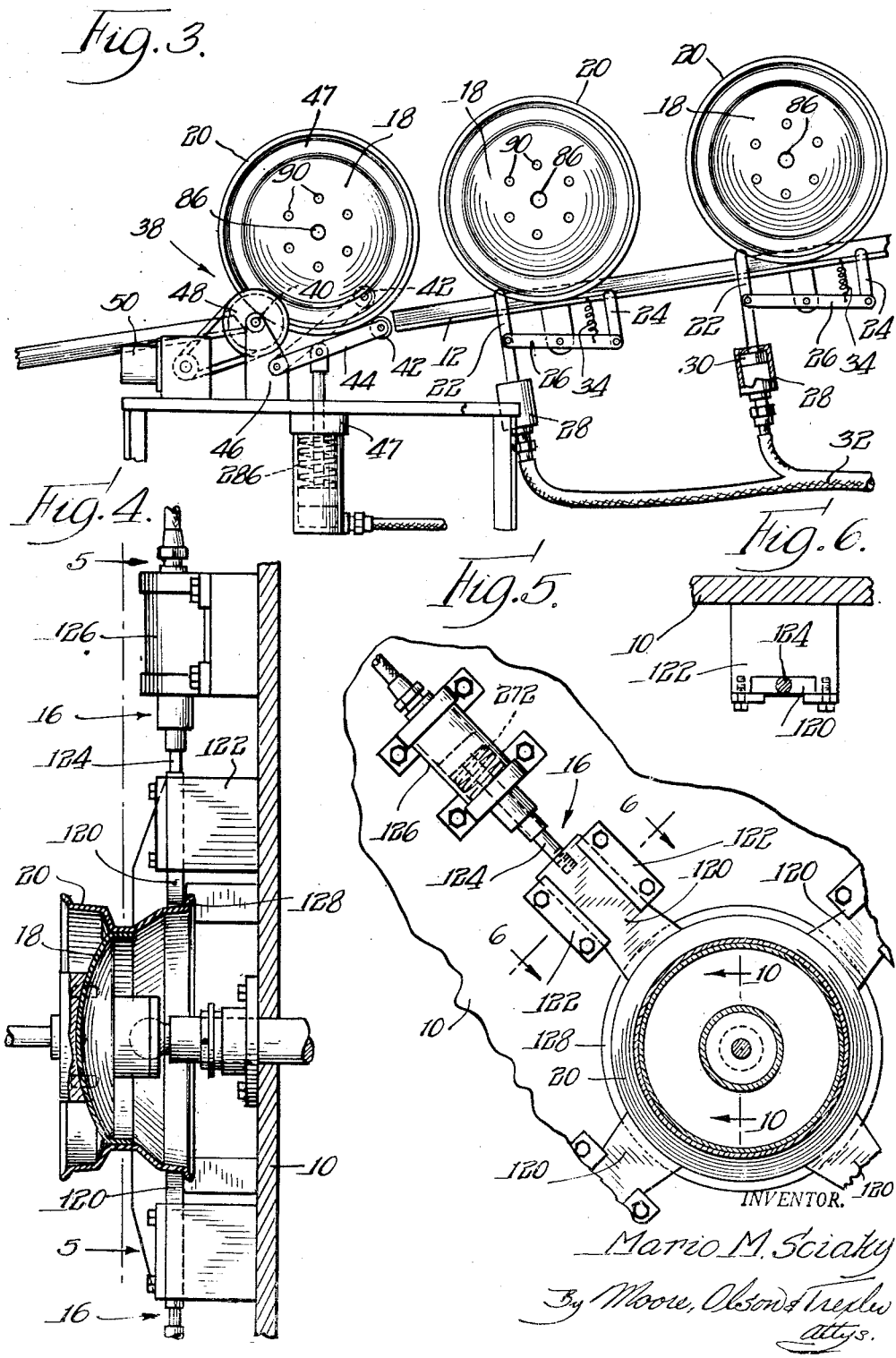

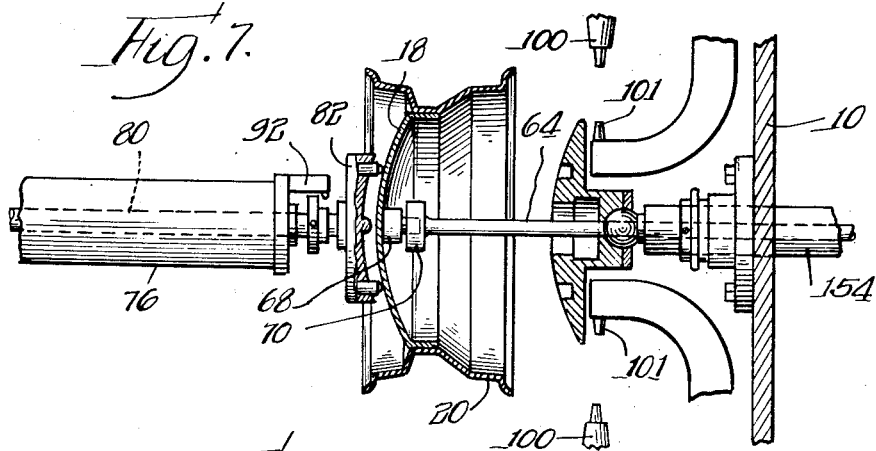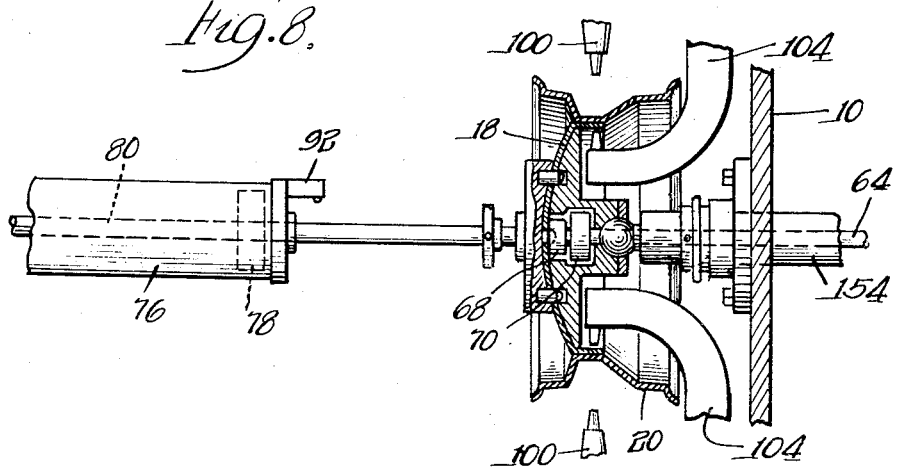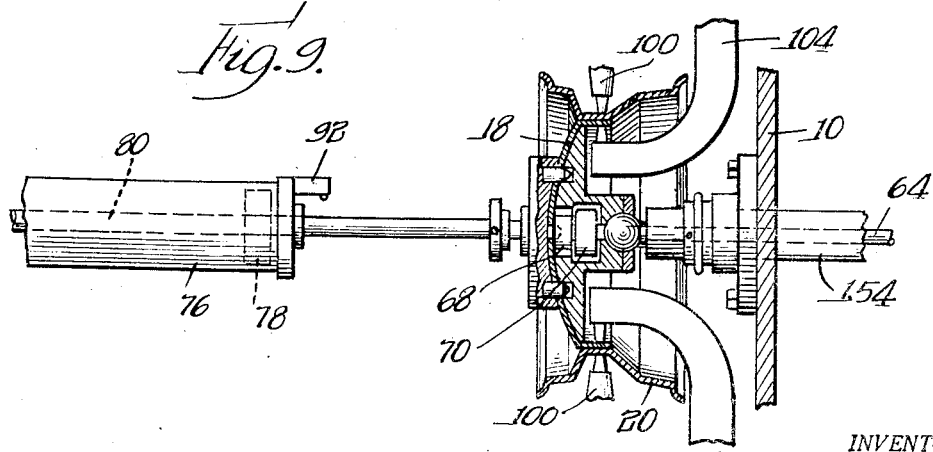

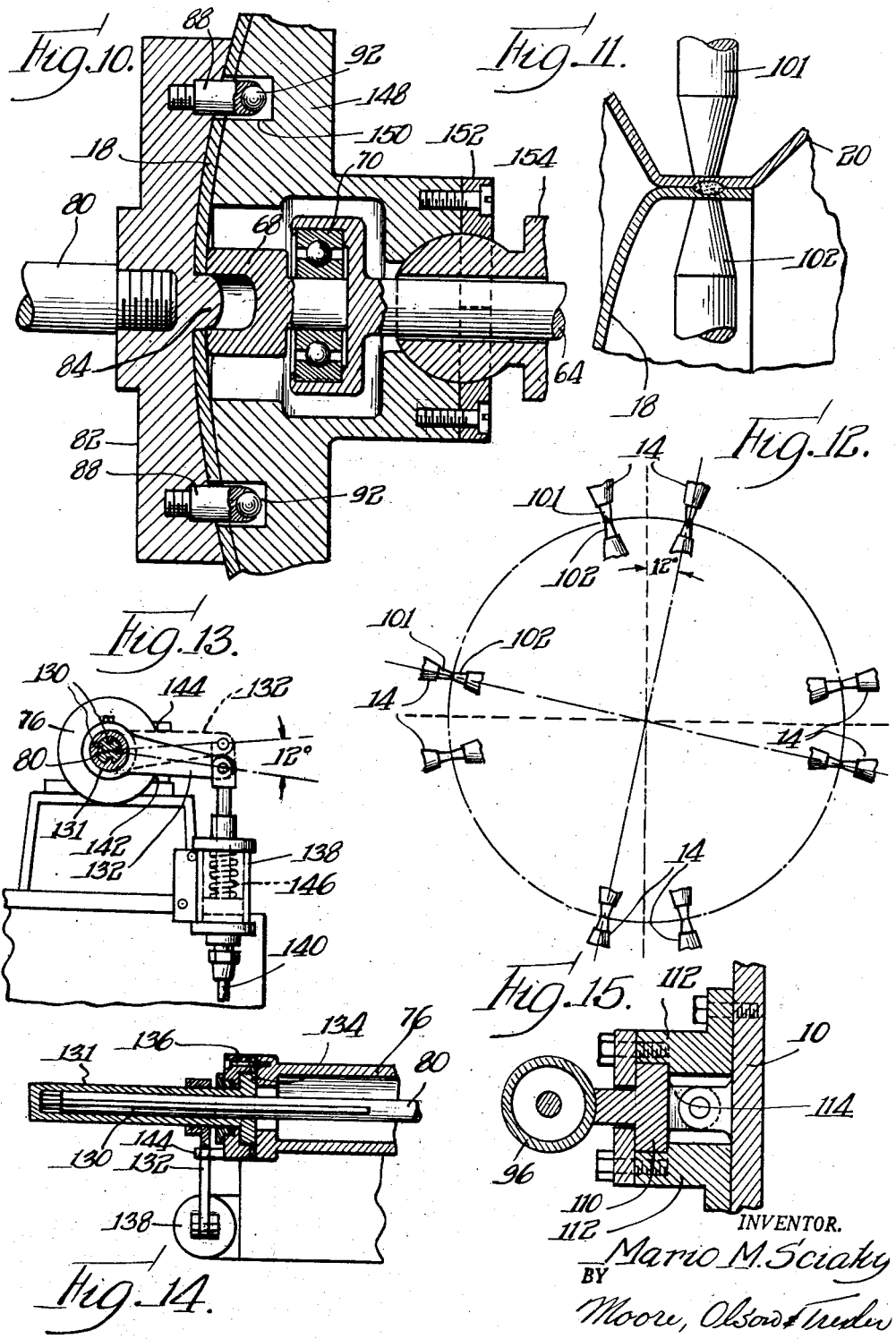

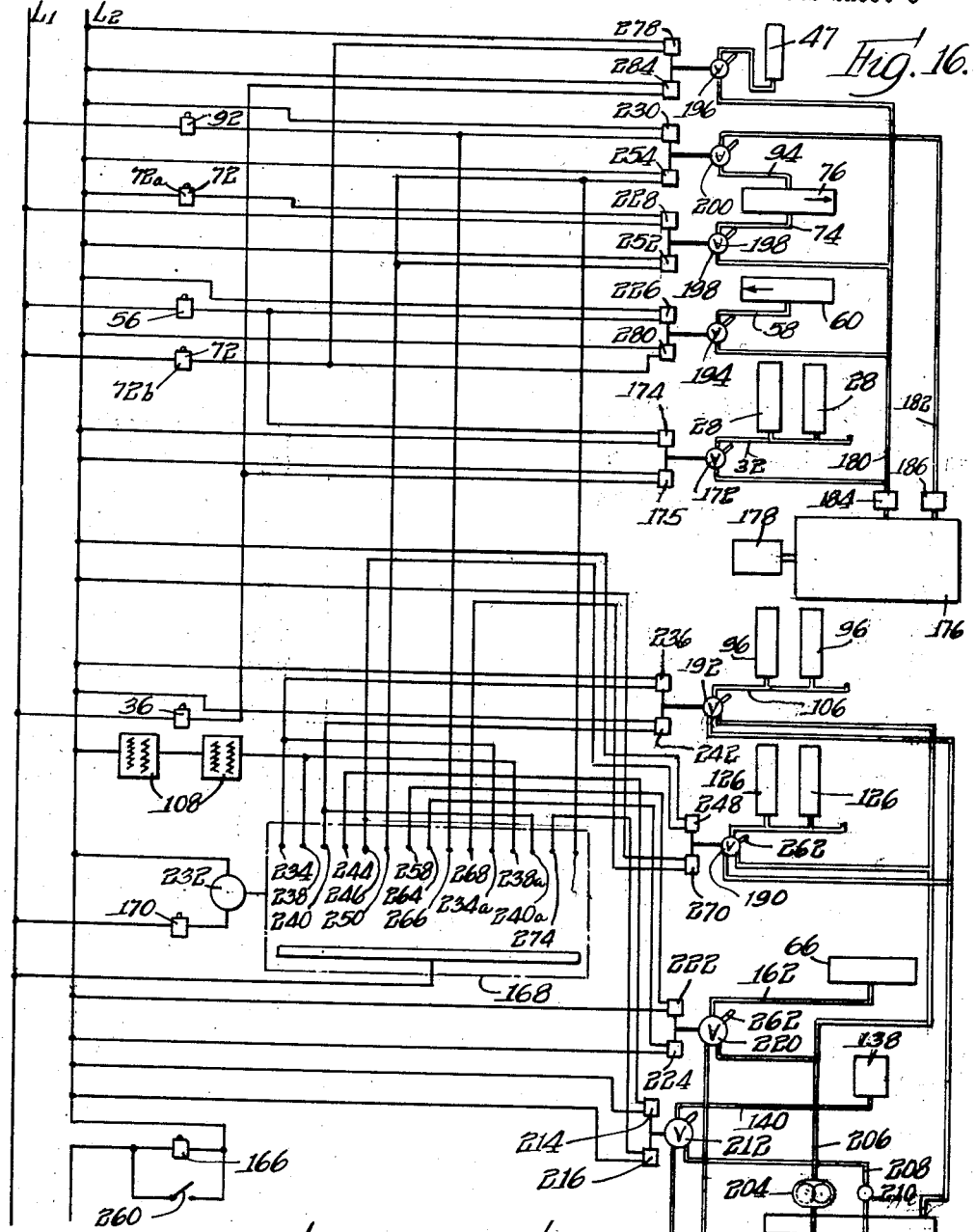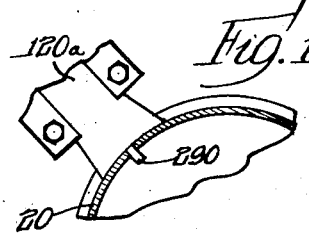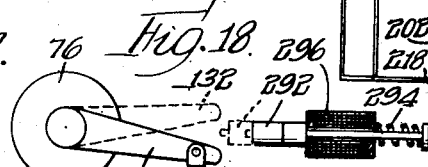

2,558,005

UNITED STATES PATENT OFFICE 2,558,005

WHEEL WELDING MACHINE AND METHOD

Mario M. Sciaky, Chicago, Ill., assignor to Welding Research, Inc., Chicago, Ill., a corporation of Illinois Application August 13, 1947, Serial No. 768,414

14 Claims. (219—4)

1

This invention relates to welding machines and welding methods, and concerns particularly machines and methods for effecting the welding of the metal parts of wheels for automotive vehicles and the like.

In the manufacture of various fabricated articles, wherein the parts thereof may be secured by welding, more expensive and time-consuming means is frequently employed for securing the parts together because of welding uncertainties, and more particularly because of the possibility that an improper welding operation might be effected, with resulting hazard and danger in the use of the finished article. For example, in the case of wheel structures for automotive vehicles and the like, it is the common practice to secure the rim to the wheel flange or body portion by rivets, although the riveting operations are costly and time-consuming, because of the difficulties in effecting the satisfactory welding of this type of article, and because of the possibilities that imperfections may result in the welding, with the incident danger in the use of the finished article.

It is an object of the present invention to provide a welding apparatus of improved construction and improved operating characteristics, and to provide improved welding methods effected thereby.

More specifically stated, it is an object of the invention to provide improved welding apparatus and methods wherein the quality of the weld is insured, wherein there is an insured margin of safety in the welded connection, and wherein the connection is tested for requisite strength and quality as an incident to the welding operations.

It is a further object of the present invention to provide improved apparatus and methods for effecting the welding of wheel structures of the type used for automotive vehicles and the like.

A still further object of the invention is to provide improved automatically operable welding apparatus and methods, of the type more particularly pointed out hereinafter, for effecting the sequential and automatic welding of metal wheel structures, and wherein the quality of the welded connection is automatically tested as an incident to the automatic welding operations.

Various other objects, advantages, and features of the invention will be apparent from the following specification, when taken in connection with the accompanying drawings, wherein certain preferred embodiments are set forth for purposes of illustration.

2

In the drawings, wherein like reference numerals refer to like parts throughout:

Fig. 2 is a transverse sectional view through the machine of Fig. 1, taken as indicated by the line 2—2 thereof;

Fig. 3 is an enlarged detail view of certain of the conveyor structures forming a part of the machine, the view being taken as indicated by the line 3—3 of Fig. 2;

Fig. 4 is a further enlarged partial transverse section through the machine, on the line 4—4 of Fig. 1;

Fig. 5 is a front view of the mechanism shown in Fig. 4;

Fig. 6 is a detail sectional view of the slide structure for the holding clamp shown in Fig. 5, taken as indicated by the line 6—6 of Fig. 5;

Figs. 7, 8 and 9 are sequential illustrative views, on the scale of Fig. 4, showing certain steps in the sequence of operation of the machine;

Fig. 10 is an enlarged detail view of the plunger structures, and associated parts, for gripping the wheel flange or body, the view being taken as indicated by the line 10—10 of Fig. 5;

Fig. 11 is a detail view showing one of the welded connections;

Fig. 12 is an illustrative view showing the method of operation of the machine;

Fig. 13 is a detail view of the wheel indexing mechanism, forming a part of the machine;

Fig. 14 is a top view of the structures shown in Fig. 13, and taken as indicated by the line 14—14 of Fig. 2;

Fig. 15 is an enlarged detail section through one of the welding heads, taken as indicated by the line 15—15 of Fig. 2;

Fig. 16 is an electric wiring and fluid flow diagram for the machine; and

Figs. 17 and 18 illustrate certain structures incorporated in a modified embodiment of the invention.

Figure 1:
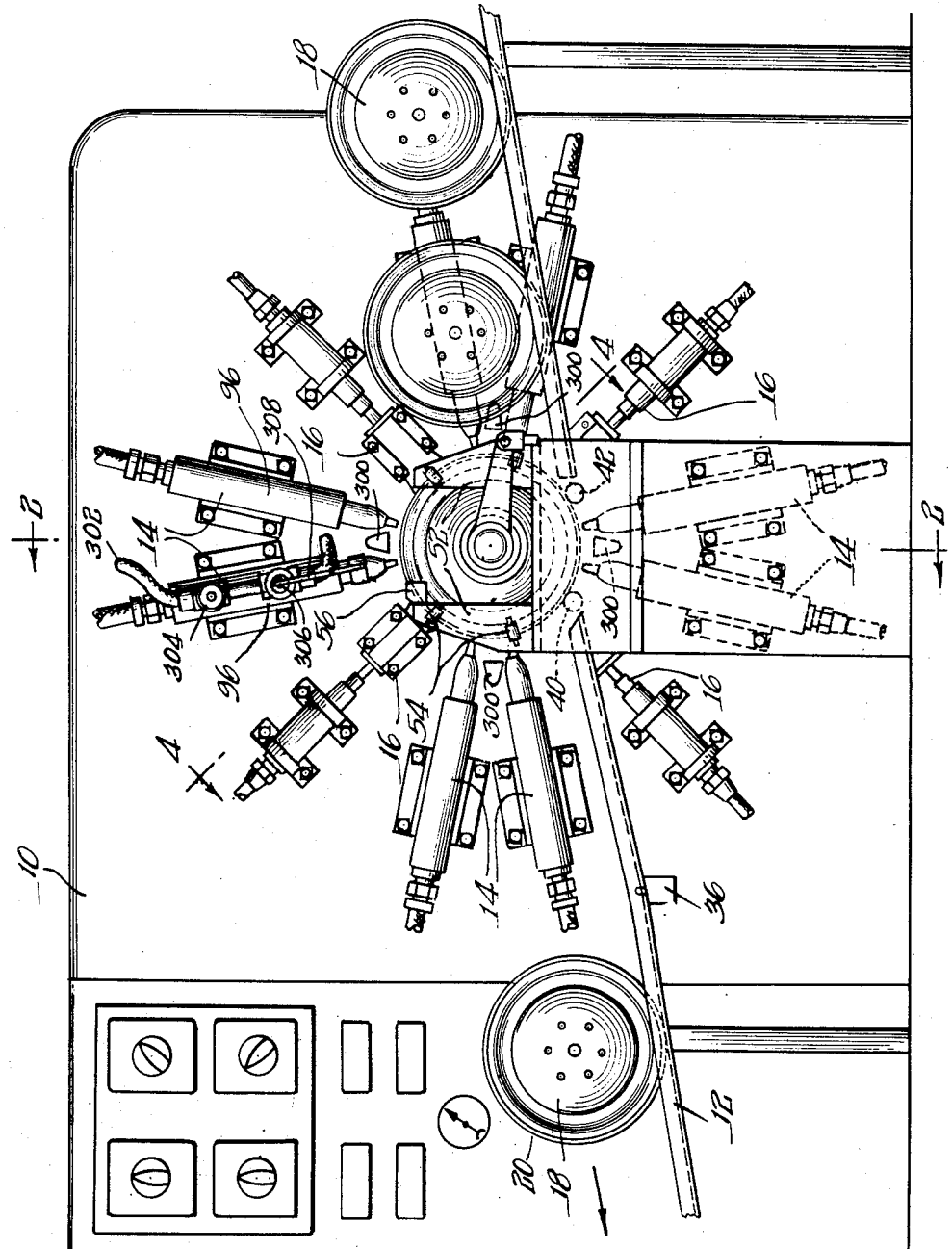
Fig. 1 is a front view, with certain parts broken away for clarity, of a welding apparatus constructed in accordance with and embodying the principles of the invention, in accordance with one preferred embodiment thereof.

In the drawings the invention has been illustrated as applied to a machine for effecting the automatic welding of wheel structures of the automotive type, the invention in certain of its aspects having particular reference thereto. It is to be understood, however, that various aspects of the invention may be used in connection with the welding of various types of articles and structures, as will be apparent hereinafter.

Referring more specifically to the drawings, and first to the structures illustrated in Figs. 1–15, in Fig. 1 an automatic machine for wheel welding is illustrated comprising, in general, a housing 10 within which the various welding auxiliaries such as transformers and the like may be mounted; a conveyor structure 12 by which the wheels or articles to be welded are transferred to and withdrawn from the machine; a plurality of welding heads 14, there being eight such heads provided in the particular embodiment disclosed; and a series of clamp devices 16 forming a part of and cooperable with certain testing apparatus incorporated in the machine and subsequently to be described.

Prior to delivery to the present machine, the wheel flange or body 18, Fig. 4, has been press-fitted into the rim 20, the present machine being provided for welding the body flange and rim together into a structurally sound, integral unit.

The conveyor structures by which the wheels are delivered to the machine, for welding, are best shown in Fig. 3. The wheels are delivered to and pass downwardly along the inclined conveyor 12 by gravity, under control of a plurality of release or feeding devices. Each of these devices comprises a pair of pins 22 and 24, pivotally interconnected by a lever arm 26, the arrangement being such that as one pin is projected into wheel stopping position the other is withdrawn. The pins are arranged to be operated by a plurality of simultaneously actuated operators, each of which comprises an air cylinder 28 and piston 30, interconnected with a common source of air pressure supply 32. As compressed air is supplied to the cylinders 28 the several pins 22 are simultaneously projected into wheel stopping position, and the pins 24 simultaneously withdrawn. As the air is released from the cylinders pins 24 are projected and pins 22 are withdrawn by the action of retraction springs 34. By this means the wheels are fed along the conveyor, in step by step fashion, under individual control. The compressed air supply is controlled from a valve structure, later to be described, which is in turn actuated by a control circuit including a limit switch 36, Fig. 1, actuated by a wheel as it leaves the machine, after welding. In this way the removal of each welded article from the machine automatically actuates the conveyor so as to transmit a new article or wheel to be welded to the machine. The electrical and fluid control circuits for the various control valves of the machine will be subsequently described in reference to Fig. 16.

As the wheel is released from the final control pin 22 it rolls to a position as indicated at 38, Fig. 3, wherein the wheel rim 20 rests conjointly upon a pair of spaced rollers 40 and 42. Roller 42 is an idle roll and is carried on the end of an arm 44 pivotally mounted upon a frame bracket 46 and arranged for actuation by a cylinder and piston structure 47. Roller 40 is a powered roll, and is arranged to be continuously rotated to effect the rotation of the wheel 47 resting thereon, at selected intervals, by means of a pulley 48 powered from an electric drive motor 50. As the wheel becomes positioned upon the rolls 40 and 42, it moves adjacent a pair of upstanding frame bars 52, Fig. 1, provided with anti-friction wheel engaging rolls 54. One of the bars carries a limit switch 56, the arrangement being such that as the wheel moves to supported position upon the rolls, the limit switch is actuated.

The limit switch 56 forms a part of the controls for the conveyor actuators 28, as will be subsequently described. Actuation of limit switch 56 also causes the introduction of compressed air from a low pressure source of supply 58 into a pusher cylinder 60, Fig. 2, having therein an air actuated piston 62. The piston 62 is secured to the end of a piston rod 64 which extends through a cylinder and piston structure 66, later to be described, and carries at its end a pusher member 68, the details of which are best illustrated in Fig. 10. More particularly, it will be seen that this pusher member is carried upon the end of the piston rod by means of an anti-friction bearing 70 so as to be freely rotatable thereon.

As the piston 62 is projected forwardly or to the left it advances from its normally retracted position, as shown in Fig. 2, to an advanced position, as illustrated in Fig. 7, wherein the pusher head is brought into engagement with the wheel flange 18 of the wheel positioned upon the rollers 40 and 42. The wheel is caused to rotate, at this time, due to its resting engagement upon the rotatable roll 40, the anti-friction bearing 70 and the frame rolls 54, Fig. 1, permitting free wheel rotation.

As the piston rod 64 reaches its Fig. 7 position, in engagement with the wheel flange, a collar 71 carried thereby is arranged to actuate a limit switch 72, Fig. 2, carrying two sets of contacts alternately operated upon each advance of the piston rod. The contacts operated by the piston rod advance, just described, cause the introduction of compressed air from a low pressure supply 74 into a feeding pusher cylinder 76 having therein an air actuated piston 78. This piston is secured to a piston rod 80, the forward end of which carries a wheel engaging face plate 82, the details of which are best shown in Fig. 10.

Referring to Fig. 10, it will be seen that the face plate 82 is provided with a relatively shorter projection 84 engageable into the central or hub opening 86, Fig. 3, of the wheel flange, and a plurality of relatively longer finger pins 88 positioned in accordance with the spacing of the wheel flange bolt holes 90, each finger carrying an anti-friction ball 92 at its end.

As air pressure is applied to the piston 78, the face plate 82 is shifted forwardly, or to the right from its normally retracted position, as shown in Fig. 2, to a position as shown in Fig. 7, wherein the anti-friction balls 92 are brought into engagement with the wheel flange 18; so that as the wheel is rotatably driven by the roll 40, the fingers 88 will ultimately become aligned with the wheel bolt holes 90 and be caused to interlock therewith, in the manner indicated in Fig. 10. The face plate 82 is locked against rotation, by means subsequently to be described, so that upon the effecting of such interlocking engagement, further rotation of the wheel is arrested, the roll 40 merely rotating idly thereunder. The relative sizes of the pistons 62 and 78 of the pushers 60 and 76, respectively, are such that when the cylinder 76 is interconnected with the low pressure source 74, as described, the force exerted by piston 62 is somewhat greater than that exerted by piston 78, so that the wheel is retained against axial movement away from the frame rolls 54.

The piston rod 80 of the feeding pusher 76 carries a collar which, as the fingers 88 drop into interlocking position, is arranged to actuate a limit switch 92, Fig. 2, this limit switch being of a type so that it is actuated only upon a rightward or forward movement of the piston rod 80.

As will more particularly appear hereinafter when the control circuit is described, operation of limit switch 92 causes introduction of compressed air into the feeding pusher cylinder 76 from a relatively higher source of compressed air supply 94, whereupon the pressure exerted by piston 78 is somewhat greater than that exerted by piston 62, so that the wheel, clamped between the pusher head 68 and the face plate 82, is caused to move to the right from the position of Fig. 7 into a welding position, as illustrated in Fig. 8, wherein the wheel is brought into juxtaposition to the welding heads 14 and the clamping devices 16, previously mentioned.

Each welding head, as is best shown in Figs. 2 and 15, comprises a cylinder 96 having a piston 98 mounted therein. The piston 98 is connected to one of the welding jaws 100 arranged to carry a welding electrode 101, whereas the cooperative welding electrode 102 is carried by an extension 104 of the cylinder 96. It will be seen that as fluid pressure is introduced into the cylinder from a suitable source of fluid pressure supply as indicated at 106, the welding electrodes will be brought into clamping engagement with the work parts to be welded, as shown in Fig. 11. As will be understood, the welding electrodes are connected with a suitable welding transformer 108, Fig. 2, for the application of the welding current.

The cylinder 96 of each welding head is floatingly mounted so that the clamped positioning of the electrodes may correspond to irregularities in the work piece. To this end each cylinder 96 is carried by a slide member 110, Fig. 15, mounted in frameways 112, the slide member having a detent portion 114 disposed between a pair of frame carried compression springs 116 and 118, Fig. 2. As the welding electrodes are brought into clamping engagement with the work parts it will be seen that the springs 116 and 118 may yield slightly, in one direction or the other, so as to conform the positioning of the electrodes to work piece surface irregularities.

The clamping devices 16 are best shown in Figs. 4, 5 and 6. Each clamping device comprises a clamp member 120 arranged for longitudinal reciprocation within frame slideways 122, the clamp member being actuated by means of a piston rod 124 forming a part of a fluid operated piston and cylinder structure as indicated at 126. It will be seen that as pressure fluid is introduced into the operating cylinders, the several clamp members 120, there being four such members in the particular embodiment disclosed, will be projected as illustrated in Fig. 4, so as to interlock with an upstanding flange portion 128 of the wheel rim.

The timed functioning of the welding heads 14, and of the clamp structures 16, in the automatic machine cycle, will be presently described in reference to the control circuit.

Means is provided for indexing the face plate 82, in connection with the welding operations, such means being best illustrated in Figs. 2, 13 and 14. More particularly, the end of the piston rod 80 is arranged to project through the end of the cylinder 76, and is suitably splined as indicated at 130 for splined connection with a cap member 131 to which is fixed a laterally projecting arm 132. The cap member is provided with a flange 134 rotatably journalled onto the end of the cylinder between suitable sealing gaskets, the flange being held in position by means of a bolted cylinder end coupling piece 136. By this means the arm 132 is journalled for rotation in respect to the cylinder 76, and is spline connected to the piston rod 80 so that the piston rod and arm are constrained for rotation as a unit, but the piston rod is permitted to shift longitudinally in respect to the journalled arm.

The means for operating the arm, to thereby effect the rotatable indexing of the piston rod and its associated face plate 82, comprises a hydraulic actuator 138, consisting of a cylinder and piston construction and connected to a source of liquid pressure supply as indicated at 140. The range of movement of the arm 132 is limited by a pair of stops 142 and 144 carried by the cylinder. The introduction of pressure fluid into the cylinder 138 raises the arm 132 into its dotted line position, as indicated in Fig. 13. A compression spring 146 within the cylinder normally holds the arm in its lowered full line position as indicated.

Means is also approvided for applying a testing pressure to the welds, in connection with the welding operations, by applying an axial thrust of desired magnitude to the wheel flange 18 and relative to the wheel rim 20 while the latter is clamped in position against movement. This testing apparatus comprises a testing plunger head 148, Fig. 2, the detailed shaping of which is best shown in Fig. 10. It will be seen that the plunger head is provided with an annular recess 150, so as not to interfere with the action of the finger pins 88. The plunger head is preferably universally connected by means of a bolted flange plate 152 to the rounded end of a plunger shaft 154 through which the piston rod 64, previously mentioned, axially extends. The end of the shaft 154 is disposed within the cylinder 66, the shaft being provided with a pair of adjustable collars 156 and 158 between which there is operable a plunger piston 160. Upon the introduction of pressure liquid from a supply source 162 into the cylinder 66, the piston 160, which is normally held in its retracted position as shown in Fig. 2 by means of a compression spring 164, will be advanced to the left into engagement with the collar 158, to thereby impart a predetermined impact and pressure to the plunger head 148, depending upon the pressure of the fluid and its rate of introduction into the cylinder. As will be later more particularly pointed out, if the welds have been properly formed no movement of the plunger head 148 will occur as the result of the testing pressure. If the welds have been imperfectly formed and movement occurs, a collar on shaft 154 effects the actuation of a limit switch 166, Fig. 2, which inhibits further operation of the machine, as will later more clearly appear.

The welding heads 14, the clamps 16, the indexing cylinder 138, and the testing plunger 148 are all operated in an automatic cycle under control of a timer 168, Fig. 16, this timer in turn being controlled by a limit switch 170, Fig. 2, actuated by the collar 71 on the piston rod 64. The limit switch 170 is so constituted that each alternate engagement of the collar 71 therewith effects the closing of its contacts to initiate operation of the timer.

*Operation*

The operation of the machine will be best understood by reference to the control diagram, Fig. 16. Referring, for example, to the conveyor actuators 28, it will be seen that the air pressure supply line 32 for these actuators is controlled by a valve 172 which conveniently may be a two-position three-way valve so arranged that in one valve position the conduit 32 is interconnected with a source of air pressure supply, whereas in the other valve position the air pressure supply is cut off and the line 32 vented to atmosphere. An operating solenoid 174 moves the valve to its pressure supply position, whereas a cooperative solenoid 175 shifts the valve to its venting position.

The compressed air supply comprises a supply reservoir 176, Fig. 16, supplied with compressed air from a compressor 178. The reservoir 176 is provided with two outlet conduits 180 and 182 associated, respectively, with a lower pressure reducing valve 184 and a higher pressure reducing valve 186, the supply conduit 180 thereby constituting a source of lower air pressure supply, and the conduit 182 constituting a source of higher air pressure supply for the various air actuators associated therewith.

Similar three-way valves, and operating pressure and venting electromagnets are associated with each of the other air actuators, the control valve for the ejecting pusher actuator 60 being indicated at 194, and the control valve for the ejector actuator 47 being indicated at 196, in Fig. 16. As previously indicated, the feeding pusher actuator 76 is connected for both high and low air pressure actuation, the control valve for interconnecting the conduit 74 with the lower pressure supply line 180 being indicated at 198, and the control valve for interconnecting the supply line 94 with the high pressure air supply conduit 182 being indicated at 200. Each of these several three-way valves, as has been stated, is controlled by a pressure introducing electromagnet and a restoring or venting electromagnet, as indicated.

Referring further to Fig. 16, an oil reservoir is indicated at 202 from which oil is delivered by means of a continuously operating pump 204 into a supply line 206. A return line 208 controlled by a relief valve 210 is provided for maintaining a predetermined pressure in the supply line 206 during pump operation. The supply line 140 for the indexing cylinder 138 is controlled by means of a three-way valve 212 arranged for actuation by a pressure introducing coil or electromagnet 214 and a restoring or drain electromagnet 216, the arrangement being such that when the operating coil 214 is energized the valve is shifted to interconnect the conduit 140 with the pressure supply line 206, whereas when the restoring coil 216 is energized the valve is shifted to interconnect the conduit 140 with a drain line 218 returning to the reservoir so as to relieve fluid pressure within the actuator. Similarly a three-way valve 220 is provided for interconnecting the supply conduit 162 of the testing actuator 66 alternatively either with the pressure supply or with the drain line upon the operation, respectively, of a pressure introducing coil 222 or a restoring or drain coil 224. Similar three-way valves 190 and 192 are provided respectively for the clamp actuators 126 and the welding head actuators 96.

As previously pointed out, each new cycle of machine operation is initiated upon the actuation of limit switch 36 by a previously properly welded wheel as it leaves the machine. As shown in Fig. 16, the operation of this limit switch effects the energization of venting coil 175 of the conveyor control valve 172, by interconnecting the electromagnet between the electric control circuit supply lines L₁ and L₂. This permits springs 34 to act causing the wheels to be moved one step along the conveyor 12. As the end wheel on the conveyor drops into position upon the support rollers 40 and 42 limit switch 56 is actuated. As shown in Fig. 16, this limit switch energizes the pressure coil 174 for the conveyor control valve 172, to recondition the conveyor actuators, and also effects the energization of the pressure coil 226 of the control valve 194 for the pusher cylinder 60, whereby to effect the forward movement of pusher head 68 as previously described.

This forward movement of the pusher head 68 operates the first set of contacts 72a within limit switch 72 which energizes the pressure coil 228 of the control valve 198 for introducing low pressure air into the feeding pusher cylinder 76. The rotatable positioning of the wheel and the interlocking of the fingers 88 with the bolt holes thereof thereupon takes place as previously described.

As the finger pins 88 move into interlocking position limit switch 92 is actuated, also as heretofore previously mentioned, whereupon energization of the pressure coil 230 of the high pressure air control valve 200 is effected. Thereupon high pressure air is introduced into the feeding cylinder 76 causing the wheel to be shifted to its Fig. 8 position as previously described.

As the wheel is moved to its Fig. 8 position, limit switch 170 is actuated so as to energize timer motor 232, Fig. 16, causing operation of the timer 168. This timer may be of any suitable construction, so constituted as to effect, when energized, a single cycle of operation and the sequential energization of a set of contacts therein. Energization of the first contact 234 of the timer effects the operation of pressure coil 236 of the welding head control valve 192 whereby to move the welding jaws into clamping engagement with the work piece, as shown in Figs. 9 and 11. Energization of the second timer contact 238 applies current to the welding transformer 108 to thereby effect the making of eight spot welds between the wheel flange 18 and the rim 20, by the eight circumferentially arranged welding heads, as diagrammatically indicated in Fig. 12.

Energization of the next timer contact 240 effects the energization of the venting electromagnet 242 for the welding head control valve 192, thus retracting the welding electrodes from engagement with the work piece through the action of welding cylinder compression springs 243, Fig. 2.

Energization of the next timer contact 244 energizes the pressure electromagnet 214 of the control valve 212 for the indexing cylinder 138, causing the arm 132, Fig. 13, to move upwardly from its full line to its dotted line position, whereby to effect the angular indexing of the wheel through a predetermined angular distance, approximately 12° in the particular embodiment disclosed.

The energization of the next timer contact 246 energizes pressure solenoid 248 of the clamp actuator control valve 190, causing the clamps 120 to move into clamping position, as shown in Fig. 5.

Energization of the next timer contact 250 effects the actuation of the venting solenoid 252 of the control valve 198 for the low pressure supply to the feeding pusher cylinder 76; and simultaneously also effects the actuation of the venting solenoid 254 for the high pressure control valve 200, whereupon all pressure is relieved from the cylinder 76 causing it to be restored to retracted position by a cylinder contained compression spring 256, Fig. 2.

Operation of the next timer contact 258 effects the energization of the pressure coil 222 of the control valve 220 for the tester cylinder 66, thus applying hydraulic pressure to the piston 160, Fig. 2, causing it to move to the left against the action of compression spring 164 so as to impart a predetermined impact and pressure to the testing head 148. If the previously effected welds have been properly made no movement of the head 148 results. If the welds are improper or inadequate, the wheel flange 16 will be pushed to the left, in one manner or another, in respect to the clamped wheel rim 18, causing actuation of limit switch 166. As shown in Fig. 16, this limit switch is arranged in the energizing control circuit so that upon actuation it will deenergize the entire machine, including the timer, whereupon further machine operation ceases. The limit switch may be by-passed by a manually actuated control switch 260, Fig. 16, so that continued operation of the machine may be effected under manual control, after the defective part has been noted. In this connection each of the several control valves is provided with a manual control handle 262 so that the machine can be manipulated manually in any selected manner, as desired, to effect the removal of a defective work part, a disabling of the pressure supply to the testing cylinder 66, retraction of the clamps, or any other selected individual operation.

Assuming that the work piece is not defective, the actuation of the next timer contact 264 energizes the venting or return coil 224 of the tester control valve 220, whereby to relieve the hydraulic pressure from the tester cylinder 66.

Energization of the next timer contact 266 energizes the pressure coil 230 of the high pressure control valve 200 for the feeding actuator 76, whereupon the pusher face plate 82 returns into engagement with the wheel.

Energization of the next timer contact 268 causes energization of the venting coil 270 of the clamp actuator control valve 199, whereupon the clamps are retracted by actuator contained compression springs 272, Fig. 5.

Energization of the next timer contact 234a again advances the welders, and energization of the next timer contact 238a effects a second welding operation, as in the case of the contacts 234 and 238, previously described. It will thus be seen that a second welding operation is effected upon the work piece, of a magnitude the same as the first operation, but with the second set of spot welds circumferentially spaced in respect to the first set. Energization of the next timer contact 240a, which is interconnected with the contact 240, retracts the welders.

Energization of the next timer contact 274 energizes the return or the vent coil 216 of the index cylinder control valve 212, permitting the spring 146, Fig. 13, to restore the index arm to normal position.

Energization of the final timer contact 276 reenergizes the vent coil 254 of the high pressure control valve 200 for the feeding pusher actuator 76 whereupon this actuator is restored to home position and permitting the pusher head 68 to return the completely welded wheel to initial position as shown in Fig. 2. As the wheel reaches such position the limit switch 72 is again actuated causing the closing of its contacts 72b. These contacts energize the pressure solenoid 278 of the control valve 196 for the wheel ejector actuator 47, causing the movement of ejector arm 44, Fig. 3, from its full to its dotted line position, so as to eject the wheel onto the lower part of the conveyor 12 and away from the machine. Simultaneously the closing of contacts 72b energizes the venting coil 280 of the control valve 194 for the pusher cylinder 60 causing the pusher head 68 to be retracted to normal position, as shown in Fig. 2, by the action of a cylinder contained compression spring 282. As the welded wheel rolls down the conveyor, the resulting operation of the limit switch 36 not only initiates a new cycle of machine operation, as described, but also effects the energization of the venting coil 284 for the ejector cylinder control valve 196 permitting a compression spring 286, Fig. 3, to act to restore the ejector arm 44 to normal position.

It will be seen that in accordance with the machine and method described, one set of welding operations is effected, the welds produced are then tested, and thereafter a second welding operation is effected of an equal magnitude with the first. Preferably the testing pressures applied by the testing head 148 are of a magnitude equal to required service conditions. For example, in one representative automobile wheel the wheel flange and rim are secured together by four sets of three rivets, each rivet having a shear strength of twenty-five hundred pounds; giving a combined shear strength of thirty thousand pounds total. In accordance with the present invention, in the operation upon such a wheel a pressure magnitude of thirty thousand pounds would be applied to the testing head 148, so as to equal required service conditions. This testing operation thus insures the required quality of the product; and when coupled with the subsequent or second welding operation, also provided in accordance with the present invention, gives double assurance and a margin of safety rendering it impossible that an imperfectly or inadequately welded wheel may pass through the machine undetected. The welding operations are conducted sequentially and automatically, the machine requiring no addition except upon stopping in the event of an imperfect or inadequate weld.

In certain instances it may be desired to apply a torsional testing force to the wheels, in addition to the axial and impact thrust imparted by the testing head 148. In such instance a clamp structure as shown in Fig. 17 may be employed, in conjunction with the action of an additional limit switch provided for the indexing arm 132 as shown in Fig. 18.

As shown in Fig. 17, the clamps 120a, corresponding to the clamps 120 previously described, are in this instance provided with integral pins 290 arranged to project through suitable openings in the wheel rim, so that the clamps not only clamp the rim against axial movement but also against rotation. A limit switch 292 is provided for the arm 132, this limit switch being normally retracted from operative position by a spring 294, but being arranged to be projected upon the actuation of a solenoid 296 into a position as indicated by dotted lines so as to be engaged by the index arm 132 in its movement between its two operative positions. By applying hydraulic pressure to the indexing cylinder 138 while the clamps are in position a rotational testing of the welded connection between the wheel rim and the wheel flange may be thus effected. This operation can be effected merely by a suitable arrangement of the contacts within the timer 168. More particularly, in the cycle of operation, after the welders have been retracted by contact 240, after the initial weld, the clamps may be advanced to clamping position as shown in Fig. 17, the solenoid 296 energized to render the limit switch 292 operative, and hydraulic pressure then applied to the indexing cylinder 138. If the weld is defective and the indexing arm 132 moves, limit switch 292 will be actuated to stop the machine, this limit switch being arranged in the control circuit supply in series with the limit switch 166, so that operation of either limit switch deenergizes the machine. After the testing operation, by sequentially arranged timer contacts, the hydraulic pressure within the indexing cylinder is relieved, and the clamps 120a are retracted and the solenoid 296 deenergized. Thereafter the cycle of operation of the machine may be continued, as in the embodiment previously described, whereby both a torsional and an impact and axial testing is applied to the first welded connections.

It will be noted that hydraulic pressure is employed to actuate the welding heads so that high mechanical pressures as well as high current densities may be used in effecting the welds.

Preferably means is employed for applying cooling water to the welds during the welding operations, to set the welds promptly for testing and to prevent the warping of the wheel by heat. Such means may comprise a series of water nozzles 300, Figs. 1 and 2, for each set of welding heads. The supply pipe 302 is controlled by a manually operated valve 304 and by an automatic shut off valve 306 arranged for operation by the shifting of one of the welding heads. More particularly, as shown in Fig. 2, one welding head carries the valve 306 arranged for actuation by an arm 308 through a pin and slot connection, the arrangement being such that the valve is open whenever the welding heads are clamped onto the work; and provided also that the manual shut off valve 304 has been previously opened. The outlet pipe 310 from the valve 308 is connected to and supplies the several spray nozzles 300. If desired, the control valve 306 may be electromagnetically operated from the timer 168 so as to supply the cooling water to the work for a predetermined length of time after each welding operation.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A welding machine comprising support means for a work piece having a portion to be welded, a welding electrode, means for shifting the work piece and electrode relatively into contact, means for applying welding current to the electrode to effect the welding of the work piece, pressure means for applying force to said work piece portion tending to effect the separation of the weld, the movement of the pressure means beyond a predetermined position being blocked by the weld, and control means for the machine actuated by the movement of the pressure means beyond such position, whereby the control means is actuated upon the insufficiency of the weld.

2. A welding machine comprising support means for a work piece having a portion to be welded, a welding electrode, means for shifting the work piece and electrode relatively into contact, means for applying welding current to the electrode to effect the welding of the work piece, pressure means for applying force to said work piece portion tending to effect the separation of the weld while the work piece is held by the support means, whereby to effect the testing of said weld, and control means actuable only if the weld is sound for repeatedly effecting the sequential operation of the shifting means, a first actuation of the current applying means, the pressure means, and a second actuation of the current applying means in the order named.

3. A welding machine comprising support means for a work piece having a portion to be welded, a welding electrode, means for shifting the work piece and electrode relatively into contact axially of the electrode, means for applying welding current to the electrode to effect the welding of the work piece, pressure means operable substantially perpendicular to the axis of the electrode for applying force to said work piece portion tending to effect the separation of the weld while the work piece is held by the support means, whereby to effect the testing of said weld, and control means operable upon limitation of said pressure means by the weld for effecting the repeated actuation of the shifting means, the repeated actuation of the welding current applying means, and the actuation of the pressure means in predetermined automatic sequence.

4. A wheel welding machine for welding metal wheel rims to metal wheel bodies comprising support means for a wheel to be welded, a welding electrode, means for shifting the wheel and electrode relatively into contact, means for applying welding current to the electrode to effect the securing of the body and rim, and pressure means comprising a pair of members engageable respectively with the body and rim for applying force thereto tending to effect the separation of the weld whereby to effect the testing of said weld.

5. A wheel welding machine for welding metal wheel rims to metal wheel bodies comprising support means for a wheel to be welded, a spring biased welding electrode, fluid actuated means for shifting the wheel and electrode relatively into contact, fluid actuated means for applying welding current to the electrode to effect the securing of the body and rim, fluid actuated pressure means including at least some of said support means engageable respectively with the body and rim for applying force thereto tending to effect the separation of the weld whereby to effect the testing of said weld, and a common fluid control circuit for said fluid actuated means.

6. A wheel welding machine for welding metal wheel rims to metal wheel bodies comprising support means for a wheel to be welded, a plurality of circumferentially disposed welding electrodes, means for shifting said electrodes to bring them into contact with the wheel rim at circumferentially spaced points, means for applying welding current to the electrodes to effect the securing of the body and rim, and pressure means comprising a pair of members including said support means engageable respectively with the body and rim for applying force thereto tending to effect the separation of the welds whereby to effect the testing of said welds.

7. A wheel welding machine for welding metal wheel rims to metal wheel bodies comprising support means for a wheel to be welded, a plurality of circumferentially disposed welding electrodes, means for shifting said electrodes to bring them into contact with the wheel rim at circumferentially spaced points, means for applying welding current to the electrodes to effect the securing of the body and rim, a plurality of circumferentially disposed clamps, means for actuating the clamps into clamping engagement with the rim at circumferentially spaced points, and a plunger for imparting a pressure thrust to the body while said clamps are in operative position whereby to effect the testing of said welds.

8. The method of welding which comprises mounting a work piece upon a welding support, effecting a first welding operation upon the work piece, applying pressure to the work piece of a magnitude required of the weld to thereby test the weld, and thereafter welding the work piece only if the first weld is sound at a point displaced from the first weld, in the sequence named.

9. The method of welding metal wheel rims to metal wheel bodies which comprises mounting an assembled rim and body upon a welding support, effecting a first welding operation to secure the body and rim, applying pressure to the body and rim through the welding support in a direction tending to effect the separation thereof and of a magnitude required of the weld to thereby test the weld, and thereafter again welding the body and rim together at the same location if the first weld is unsound, in the sequence named.

10. The method of welding metal wheel rims to metal wheel bodies which comprises mounting an assembled rim and body upon a welding support, effecting a first welding operation to secure the body and rim, applying pressure to the body and rim in a direction tending to effect the separation thereof and of a magnitude required of the weld to thereby test the weld, and thereafter welding the body and rim together only if the first weld is sound at a point displaced from the first weld, in the sequence named.

11. A wheel welding machine for welding metal wheel rims to metal wheel bodies comprising support means for a wheel to be welded, a plurality of circumferentially disposed welding electrodes, means for shifting said electrodes to bring them into contact with the wheel rim at circumferentially spaced points, means for applying welding current to the electrodes to effect the securing of the body and rim, said electrodes being floatingly mounted to conform to irregularities in the contour of the work, and spring means for normally holding the electrodes in predetermined initial position.

12. A wheel welding machine for welding metal wheel rims to metal wheel bodies comprising support means for a wheel to be welded, a welding electrode, means for shifting the wheel and electrode relatively into contact, means for applying welding current to the electrode to effect the securing of the body and rim, and pressure means including said support means engageable respectively with the body and rim for applying relative axial force thereto tending to effect the separation of the weld whereby to effect the testing of said weld.

13. A wheel welding machine for welding metal wheel rims to metal wheel bodies comprising support means for a wheel to be welded, a welding electrode, means for shifting the wheel and electrode relatively into contact, means for applying welding current to the electrode to effect the securing of the body and rim, and pressure means including said support means rotated relatively while engaging with the body and rim for applying relative torsional force thereto tending to effect the separation of the weld whereby to effect the testing of said weld.

14. A wheel welding machine for welding metal wheel rims to metal wheel bodies comprising support means for a wheel to be welded, a welding electrode, means for shifting the wheel and electrode relatively into contact, means for applying welding current to the electrode to effect the securing of the body and rim, and pressure means comprising a pair of members one of which comprises a universally mounted plunger engageable respectively with the body and rim for applying force thereto tending to effect the separation of the weld whereby to effect the testing of said weld.

MARIO M. SCIAKY.

REFERENCES CITED

The following references are of record in the file of this patent:

UNITED STATES PATENTS

| Number | Name | Date |
|---|---|---|
| 1,635,536 | Butler | July 12, 1927 |
| 1,703,588 | Meadowcraft | Feb. 26, 1929 |
| 2,100,502 | Campbell et al. | Nov. 30, 1937 |
| 2,268,815 | Funk | Jan. 6, 1942 |
| 2,316,597 | Kershaw | Apr. 13, 1943 |
| 2,341,133 | Weightman | Feb. 8, 1944 |